April 15, 1958 O. T. WEBBER ET AL 2,830,825
MOBILE SERVING UNIT HAVING ADJUSTABLE SHELVES
Filed Jan. 17, 1955 2 Sheets-Sheet 1
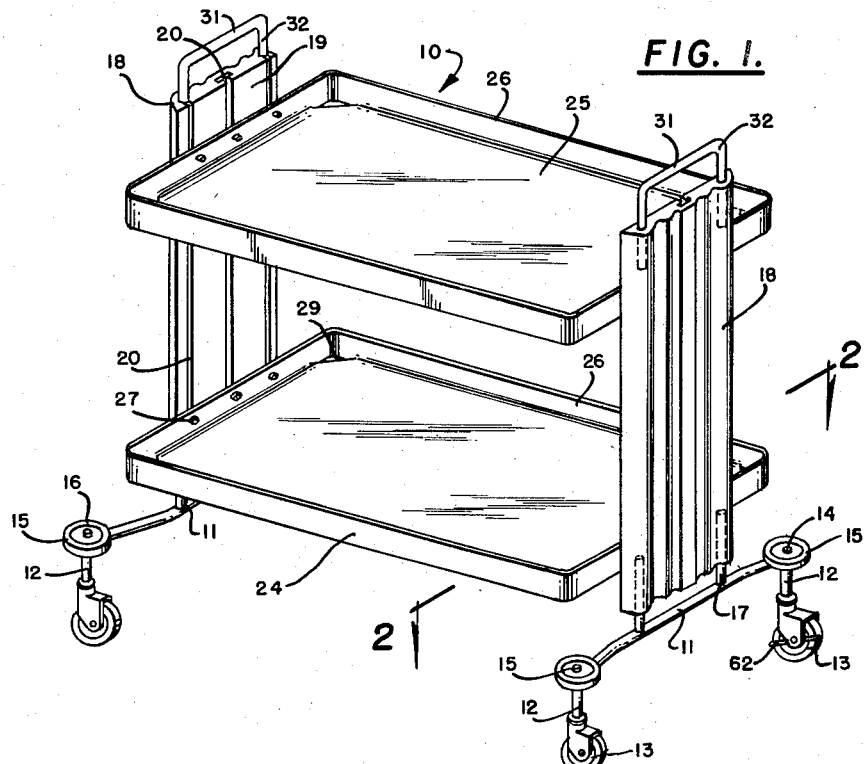
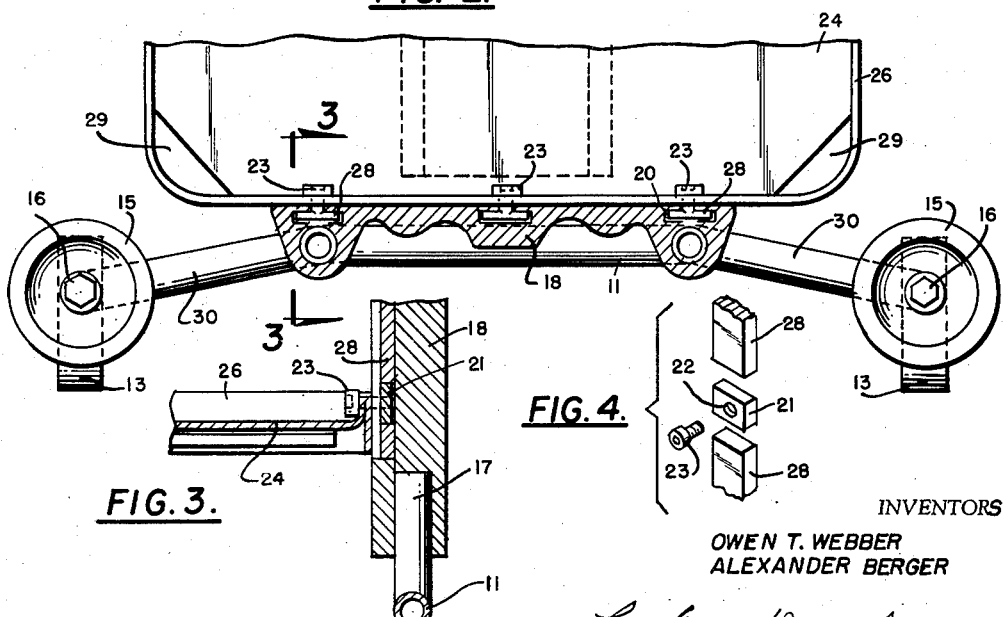
INVENTORS
OWEN T. WEBBER
ALEXANDER BERGER
BY
ATTORNEYS April 15, 1958     O. T. WEBBER ET AL     2,830,825
MOBILE SERVING UNIT HAVING ADJUSTABLE SHELVES
Filed Jan. 17, 1955     2 Sheets-Sheet 2

INVENTORS
OWEN T. WEBBER
ALEXANDER BERGER

BY *Cushman, Darby & Cushman*

ATTORNEYS

United States Patent Office 2,830,825
Patented Apr. 15, 1958

2,830,825

MOBILE SERVING UNIT HAVING ADJUSTABLE SHELVES

Owen T. Webber, New York, N. Y., and Alexander Berger, Pottstown, Pa.

Application January 17, 1955, Serial No. 482,188

2 Claims. (Cl. 280—79.3)

The present invention relates to an improved mobile unit of the knock-down type, provided with detachable means which when assembled serves to support and transport a multiplicity of different articles, such as items of food and the like.

An important object consists in providing a mobile unit in the form of a shelving rack and which includes spaced uprights in the form of panels or metal tubes, which are detachably connected to longitudinally spaced transversely disposed axles to which are connected rollers for facilitating the transporting of the mobile unit from place to place. Between the uprights or panels are arranged to be positioned vertically spaced supporting members, such as shelves, containers or the like, that are movably connected to the uprights or panels so as to be adjustably spaced vertically relative to each other. Additionally, the panel members may be formed in sections which are detachably connected so as to vary the height thereof and above the top shelf may be provided an opened or closed member, the top surface of which may be utilized to provide a working table or stand.

A still further object comprehends the provision of a knock-down mobile unit constructed of pre-formed parts carried in stock and which are readily replaceable or interchangeable so as to be capable of diversified uses and which may be readily changed over or converted at a moment's notice to be used for a variety of different purposes.

Other objects and advantages of the invention will become apparent from the following description when taken in conjunction with the accompanying claims and drawings.

Referring to the drawings, in which are shown several preferred embodiments the invention may assume:

Figure 1 is a perspective view of a mobile unit constructed in accordance with the present invention;

Figure 2 is a transverse sectional view taken substantially along the line 2—2 of Figure 1;

Figure 3 is a sectional view taken substantially along the line 3—3 of Figure 2;

Figure 4 is a detailed exploded view showing the spacers arranged to be positioned between the shelves and a clamping nut or plug for receiving a locking bolt that adjustably connects a shelf or rack to an upright or panel member;

Figure 5:
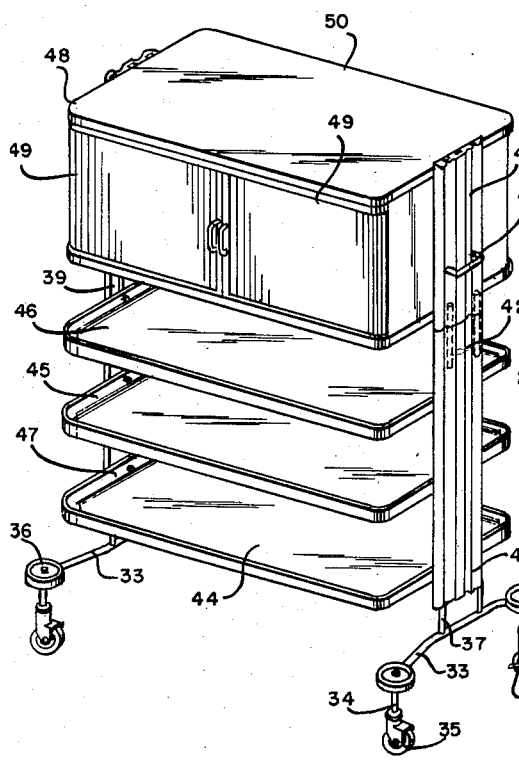
Figure 5 is a perspective view of a modified form of the invention showing the mobile unit provided with extension means for increasing the height thereof.

Referring to the drawing, 10 generally indicates a mobile unit assembly constructed in accordance with the present invention and which is formed of a number of knock-down or dismantlable parts that may readily be selected and assembled from a series of stocked pre-formed parts of varying sizes and shapes. As particularly shown in Figures 1 and 2, the mobile assembly or truck includes a pair of longitudinally spaced substantially parallel axles 11 similar in shape and construction. To the ends of each of the axles 11 are suitably connected depending stems 12 to which in turn are pivotally connected the rubber tire wheels or casters 13 so as to facilitate the transportation or movement of the mobile unit from place to place. Additionally, the upper portions of the stems 12 constitute axles 14 on which are rotatably mounted buffer wheels 15 that preferably are similar in construction and operation to the ground wheels 13 so as to be interchangeable therewith. Each of the upper ends of the stems 12 is preferably formed so as to receive a retaining nut 16 (Fig. 2).

Extending upwardly from an intermediate portion of each of the axles 11 are a pair of parallel spaced pintles or fingers 17. Arranged to be detachably connected to each of the axles 11 are uprights or members 18 which, as shown in Figure 1, are in the form of metal panels of less width than the length of the axles 11 and of any suitable height. The inner opposed faces of sides 19 of each of the panels 18 is formed with spaced vertical T-shaped grooves or slots 20 co-extensive in length with the panels and arranged to slidably carry retaining nuts or plugs 21 (Fig. 4). Each of the nuts 21 has a central threaded opening 22 for receiving a threaded bolt 23 of any suitable type, such as a Philips head bolt. Any one of a variety of shelving trays or the like, may be horizontally positioned between the uprights 18, and adjustably connected thereto, so as to be vertically separated a predetermined distance from each other. As shown, a lower shelf 24 and a similar shaped upper shelf 25 are arranged to be connected to the portable assembly. However, it will be manifest that other types of supporting members or containers may be substituted for the trays, if desired. Each of the trays has a marginal upwardly extending continuous flange 26 provided at its opposite ends with a pair of openings 27 arranged when aligned with a nut or plug 21 carried by an adjacent slot, to be connected thereto by one of the retaining bolts 23 which extends through the aligned openings 27 and 22 so as to threadedly engage the nut 21 (Fig. 3) to adjustably maintain the shelves in proper spaced position relative to each other.

Elongated metal, plastic, or wood strips 28 of predetermined lengths, are slidably mounted within the grooves 20 and are arranged to be positioned on opposite sides of the nuts 21, so as to act as spacers between the shelves 24 and 25, and also as closures for the slots 20, in order to prevent foreign matter from collecting in the slots and thus enhance the cleanliness and ease of cleaning the mobile unit when the parts are assembled. The spacer strips 28 are stocked in different lengths, so as to be easily selected, depending upon the space desired to be maintained between the shelves or other receptacles carried by the end members. Each of the shelves 24 and 25 at the corners thereof may be provided with cutaway portions 29 to form drainage openings for the discharge of liquids and which also facilitate the cleaning of the horizontal trays when connected to the mobile unit. Each of the axles 11 preferably has its end portions bent or canted as at 30 (Fig. 2), so as to enhance the riding qualities of the unit. It will be noted that the length of each of the axles is such that the wheels or casters 13 are positioned outside of and below the corners of the trays, thus providing additional stability to the mobile unit when the parts are assembled. U-shaped metal handles 31 are arranged to have their depending arms 32 detachably inserted within the end slots 20 of the panels 18 so as to facilitate the moving of the mobile unit from place to place.

In the modified form of the invention, shown in Figure 5, the axles 33 are substantially similar in structure to the axles 11 previously described, and each may be provided at the ends thereof with depending stems 34 to which are pivoted the rubber wheels or casters 35. Also carried by each end of the axles 33 are the buffer wheels 36. Spaced dowels or arms 37 extend upwardly from each axle 33 so as to releasably fit into complementary formed T-shaped slots 39 or openings in the adjacent end panel 40 and which are similar in shape and size to the slots 20, previously described. Each upright 40 is arranged to have detachably connected thereto a similar shaped section 41 by means of the dowel pins 42 which extend into the aligned openings 39 in the upright 40 and its extension 41, so as to increase the height or length of the upright in order for the mobile unit or assembly to support and carry additional trays or a super-structure, such as opened or closed containers. Each of the upper sections 41 of the upright may be provided with an operating or lifting handle 43.

As shown, three trays 44, 45, and 46 are adjustably connected to the upright by the clamping bolts 47 similar in construction and operation to the bolts 23, previously described, so as to be maintained in proper vertical spaced position. Additionally, between the sections 41 there may be positioned an enclosed container 48 having the slidable door sections 49, so as to permit convenient access to the interior thereof. The container 48 may be provided with tiers or shelves so as to accommodate various items of food and the like. Moreover, it may be insulated so as to maintain such items in a warm condition or, if desired, maintain the food in a cool condition. The top 50 of the container may serve as a work table or stand, if necessary. When the section 41 and the container 48 are removed from the unit, the top tray 46 may be conveniently used as a work table.

Figure 6:
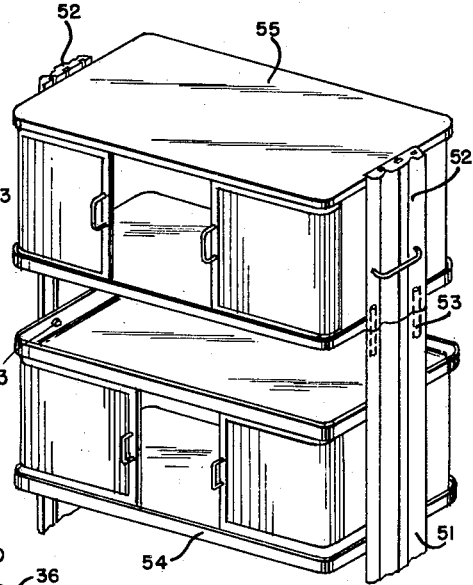
Figure 6 is a detailed perspective view of a modified form of the invention shown in Figure 5.

In the modification disclosed in Fig. 6, the end panels are shown in the form of a lower section 51 and an upper section 52 similar in construction to the panel 40, previously described. The sections 51 and 52 are connected by the dowels or pins 53 so as to facilitate the assembly and removal of the upper section from the lower section. In this form of the invention, the trays or shelves are omitted and an insulated container or receptacle 54 is positioned between the uprights and below the upper closed container 55. The top of each of the containers may, if desired, be utilized as a working table and the lower container may be efficiently used to carry hot food and retain it in a warm condition until ready to be served.

It will be seen that in Figures 5 and 6, the end panels or uprights are provided with detachable extensions that constitute a super-structure which may be opened or closed and arranged to carry a variety of different articles of food or the like, either in a heated or cool condition. Moreover, the smooth top of the container may be conveniently utilized as a serving table and, if desired, the interior of each of the containers may be formed with tiers or shelves for carrying various small articles, such as dessert plates and the like.

Figures 7, 7A:
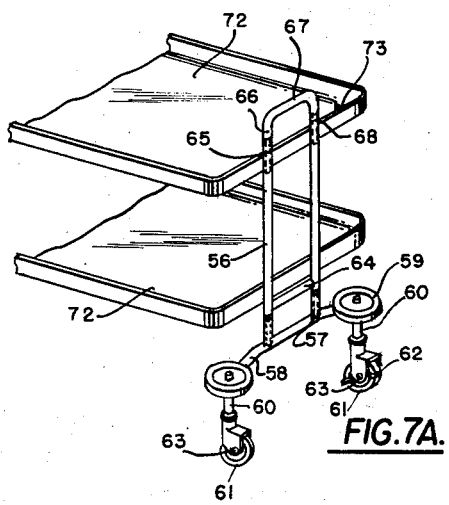
Figure 7 is a detailed perspective view of a further modification, showing the upright formed of tubular members or pipes.
Figure 7A is a detailed exploded view of the spacers and plugs associated with the pipes for separating the shelves in Figure 7.

In the modified form of the invention shown in Figure 7, the uprights are in the form of spaced pipes or tubular members 56, the lower ends of which are arranged to be inserted in the upwardly extending dowels or fingers 57 on each of the transverse axles 58. Bumper wheels 59 extend laterally and outwardly from the ends of the axles 58 and are each connected to a vertical stem 60 to which the ground-engaging rubber wheels or casters 61 are pivotally connected. In order to maintain the mobile unit in a fixed position suitable brake means are associated with each of the ground wheels 61 and may include a movable ground-engaging stop or lever 62, pivoted to the trunnions or axles 63 of each of the wheels 61. Each stop or lever 62 is arranged when one end is depressed to be moved into locking engagement with the ground in order to maintain the mobile unit or truck in a fixed position. When the opposite end of the stop is actuated, it is arranged to be swung away from the ground to an inoperative position. Adjacent the axle 58 and substantially parallel therewith is a cross bar 64 connected to the lower ends of each of the pipes 56, so as to reinforce the same. The hollow ends of the pipes 56 constitute sleeves 65 for receiving the arms 66 of a U-shaped operating handle 67 which may be detachably connected to the sleeves in any suitable manner, such as by the set screws 68. The plug 69 has a radial threaded opening 69' arranged to receive a threaded retaining bolt 71 that extends through suitable openings in an adjacent tray 72 for adjustably maintaining the same in position. Each of the trays 72 is horizontally disposed between the pipes or uprights 56 and preferably has the corners thereof provided with cutout discharge openings 73. Any number of these trays or other supporting members such as containers 50 or 55, previously described, may be associated with the knockdown mobile unit assembly, as shown in the Figures 7 and 7A. The brake levers or means 62 may also be associated with the wheels shown in the other forms of the invention for maintaining the mobile unit in a fixed position.

Figure 8:
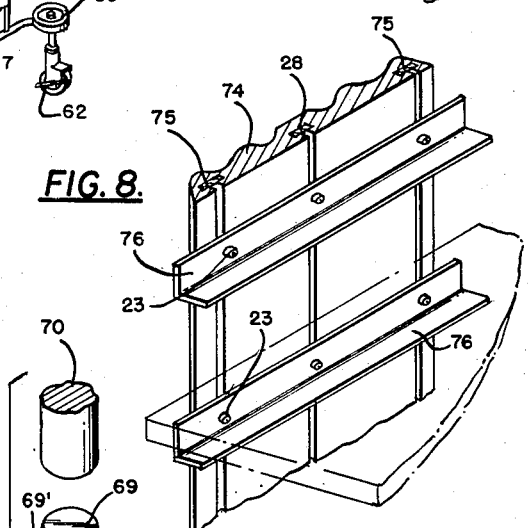
Figure 8 is a detailed perspective view with parts in section of another modification.

In the form shown in Figure 8, each of the end panels 74 is provided with three vertical T-shaped slots 75 in which are positioned the nuts 21 and the spaced flat inserts 28 (Fig. 4). The nuts 21 are arranged to receive the threaded bolts 23 which in turn extend through transversely disposed L-shaped brackets or angle members 76 that constitute supports for trays or the like, and which may be vertically adjusted or spaced relative to each other by the locking bolts 23.

Thus, it will be seen that a knock-down, light, durable and easy maneuverable mobile unit is provided which may be constructed or assembled in various sizes and shapes from pre-stocked sets of component parts. Further, portable supporting means for diversified purposes can be assembled on short notices, so as to accommodate a variety of special usages, and may be easily adjusted as to height and releasably maintained in a locked position by the foot brakes. The mobile unit may be efficiently used for serving meals to a large number of people in a restricted area and at a minimum expenditure of time, effort, and cost, due to the fact that the parts are constructed and arranged to be converted from any previous use to a truck for transporting and serving either hot or cold a complete menu. Moreover, the mobile unit is diversified in its usage so that it can be quickly adapted to a variety of special services. As an example, the form shown in Figure 5, may be used to serve a complete menu to fifty people or more in a private dining room, in which case the trays 44, 45, and 46 may be utilized for carrying certain items of food, such as salads or the like, and the insulated container 50 may be used to carry either warm or cold food. Additionally, the top of the container may be conveniently used as a serving table. In other words, it will not be necessary to design a unit of the equipment especially for any one service or menu, which in many institutions are not of daily occurrence. Manifestly, to carry or transport all the food items required on a series of standard trucks to a private dining room or the like, would be both time consuming and require a large staff. Moreover, the standard type of truck or rack is not adaptable for quick changeover to different uses. By reason of the present invention, a knock-down mobile unit is provided which can be readily assembled from a series of stocked parts, so as to be easily and quickly adaptable for diversified usages. Additionally, the height of the mobile unit may be extended, if so desired, since such extensions may constitute a part of the stock and readily be available to convert the mobile unit to any desired length. The spacer strips 28 of various lengths are carried in stock so that after the desired clearance dimension between the shelves has been decided on, these metal or plastic spacers 28 which previously have been cut into definite stock lengths, may be inserted in the slots 20 from the top of the uprights. These spacer strips 28 not only assist in supporting and maintaining the shelves or trays in position, but also fill up the voids so as to eliminate the collection of foreign matter in areas which would be difficult to clean and, consequently, would readily become unsanitary. The uprights as shown can be either in the form of panels or pipes, all of which can be kept in stock and used to immediately make up any desired type of mobile unit. The cut-away portion in each of the trays or shelves have their edges inclined downwardly slightly so as to facilitate cleaning of the tray and permit straight down liquid drainage to the floor in case any liquid is spilled. The flanges 26 in the trays (Fig. 1) are of such a height as to form a horizontal bracing and an upturned portion which is sufficiently effective to prevent the accidental removal of articles, such as a basket or box, and allow movement only when subjected to a reasonable pushing pressure.

The rubber tire wheels 13 are identical in size and shape, so that the wheels may interchangeably be used as a ground-engaging wheel or, each when worn, serve as a bumper wheel. The mobile unit is preferably made of light, durable metal, however, certain parts thereof may be formed of other suitable sturdy material, such as wood, plastic or the like. The handles such as 31 (Fig. 1) are arranged to conveniently receive a holder accommodating a card on which is marked any suitable information identifying the articles or use to which the unit is to be applied. The end panels and other specific parts are carried in stock and may be finished in a color matching any specific decorating scheme so as to enhance the attractive appearance of the unit.

The component parts of the mobile unit may be shipped in knocked-down condition and readily assembled, thus substantially reducing the transportation size of each unit and also the shipping cost.

It will be understood that the several forms of the invention shown are merely illustrative of preferred embodiments and that such changes may be made as come within the scope of the appended claims without departing from the spirit of the invention.

We claim:
1. A knock-down mobile unit of the class described including longitudinally spaced parallel axles, rollers connected to the axles, end panels having spaced longitudinally extending slots in the opposed inner sides thereof and co-extensive in length therewith, said axles having spaced upwardly extending fingers insertable in the slots in the lower ends of the panels for supporting the same, horizontally disposed shelves insertable between the uprights and having openings in opposite sides thereof, said slots having slidable plugs therein, said plugs having threaded openings, inserts in said slots on opposite sides of said plugs for maintaining the plugs a predetermined distance apart, and retaining bolts extending through the openings in the shelves and with aligned openings in the plugs so as to adjustably maintain the shelves in vertical spaced positions relative to each other when the parts are assembled.

2. A knock-down change-over mobile unit of the class described, including spaced horizontally disposed one piece axles, the end portions of the axles being free and uniformly bent outwardly, each of the end portions of the axles having vertical stems, a ground-engaging roller rotatably connected to one end of each stem and a buffer roller rotatably connected to the other end, said ground-engaging and buffer rollers being similar in size and shape so as to be interchangeable, end members extending upwardly from the axles and having spaced vertically extending openings therein, each of said axles having spaced upwardly projecting fingers releasably insertable in the openings in the end members for supporting the same, vertically spaced carrying members between the end members, the end portions of said axles projecting beyond the corners of the carrying members, and removable inserts adjustably secured in the openings in said end members and between the carrying member for engaging opposite sides of the same to maintain the carrying members spaced a predetermined distance from each other.

References Cited in the file of this patent
UNITED STATES PATENTS

| | | |
|---|---|---|
| 1,736,949 | Szekely | Nov. 26, 1929 |
| 1,969,957 | Zimmerman | Aug. 14, 1934 |
| 2,702,127 | Pastorius et al. | Feb. 15, 1955 |

OTHER REFERENCES

Publication: "Colson Material Handling Trucks," catalog No. L-292, page 52, copyrighted 1945, by the Colson Corporation, Elyria, Ohio. (Copy in Div. 47.)